(12) United States Patent
Wang et al.

(10) Patent No.: US 6,480,504 B1
(45) Date of Patent: Nov. 12, 2002

(54) PAGING CHANNEL CONFIGURATION FOR EFFICIENT WAKE-UP PERIOD UTILIZATION

(75) Inventors: Yi-Pin Eric Wang, Cary, NC (US); Torgny Palenius, Löddeköpinge (SE); Paul Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/144,272

(22) Filed: Aug. 31, 1998

(51) Int. Cl.[7] ............................. H04J 13/00; H04Q 7/20
(52) U.S. Cl. ........................ 370/442; 370/335; 370/342
(58) Field of Search .............................. 370/311, 335, 370/342; 455/458

(56) References Cited

U.S. PATENT DOCUMENTS

| | | |
|---|---|---|
| 5,491,718 A | 2/1996 | Gould et al. |
| 5,991,600 A * | 11/1999 | Anderson et al. .......... 340/7.34 |
| 6,282,178 B1 * | 8/2001 | Noerpel et al. ............. 370/229 |
| 2002/0016190 A1 * | 2/2002 | Higuchi et al. ............. 455/574 |

FOREIGN PATENT DOCUMENTS

| | | |
|---|---|---|
| GB | 2313253 A | 11/1997 |
| WO | WO9512931 | 5/1995 |

* cited by examiner

Primary Examiner—Melvin Marcelo
(74) Attorney, Agent, or Firm—Burns, Doane, Swecker & Mathis, L.L.P.

(57) ABSTRACT

Methods and systems for optimizing standby mode power performance in radiocommunication systems are described. Techniques are providing which permit a mobile station to read synchronization symbols, e.g., long code masked symbols, in transmitted in differently numbered timeslots while minimizing wake-up time in idle mode.

26 Claims, 5 Drawing Sheets

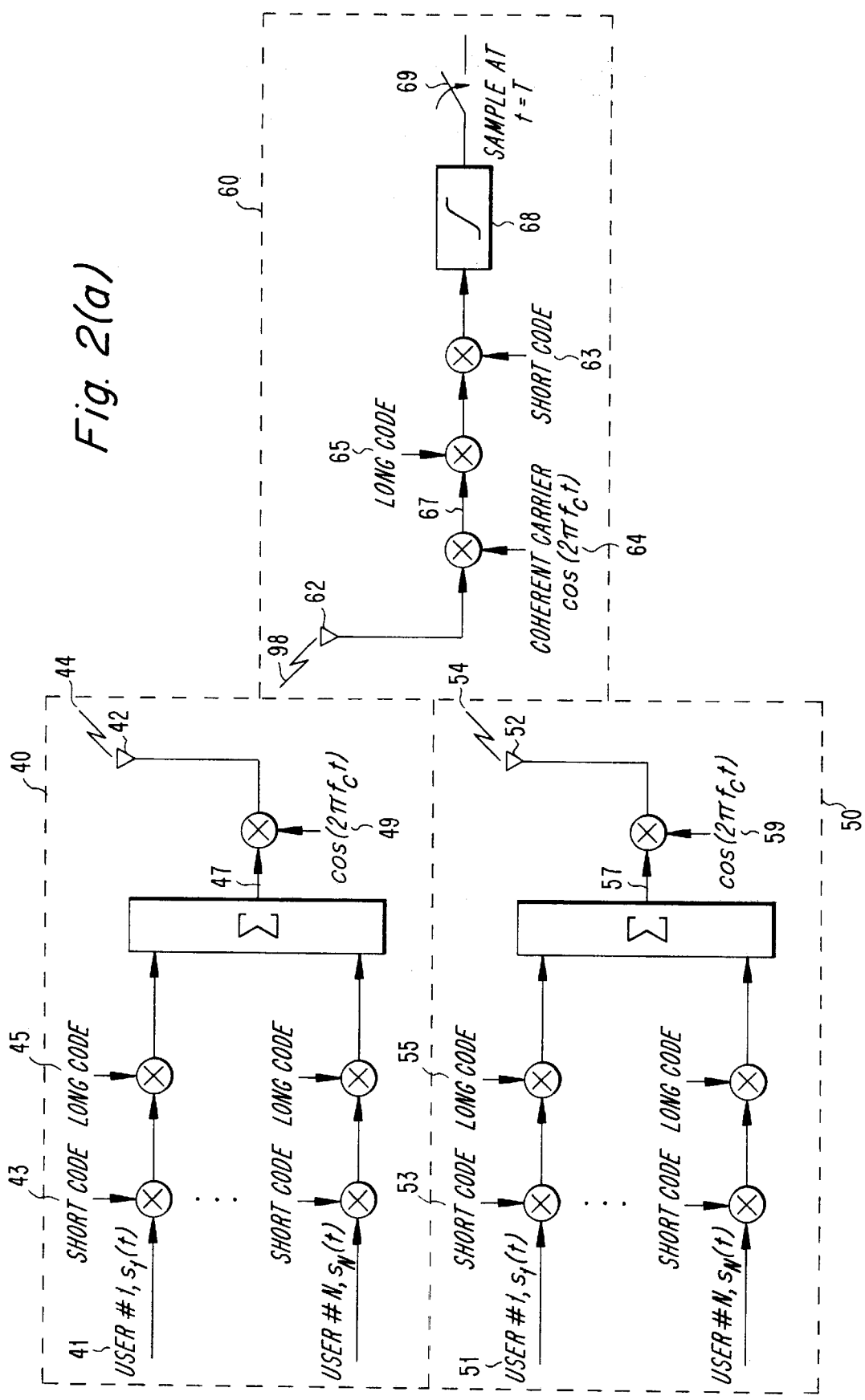

Fig. 2(b)

| SLOT # | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| GROUP 1 | 1 | 1 | 2 | 11 | 6 | 3 | 15 | 7 | 8 | 8 | 7 | 15 | 3 | 6 | 11 | 2 |
| GROUP 2 | 1 | 2 | 9 | 3 | 10 | 11 | 13 | 13 | 11 | 10 | 3 | 9 | 2 | 1 | 16 | 16 |
| GROUP 3 | 1 | 3 | 16 | 12 | 14 | 2 | 11 | 2 | 14 | 12 | 16 | 3 | 1 | 13 | 4 | 13 |
| GROUP 4 | 1 | 4 | 6 | 4 | 1 | 10 | 9 | 8 | 17 | 14 | 12 | 14 | 17 | 8 | 9 | 10 |
| GROUP 5 | 1 | 5 | 13 | 13 | 5 | 1 | 7 | 14 | 3 | 16 | 8 | 8 | 16 | 3 | 14 | 7 |
| GROUP 6 | 1 | 6 | 3 | 5 | 9 | 9 | 5 | 3 | 6 | 1 | 4 | 2 | 15 | 15 | 2 | 4 |
| GROUP 7 | 1 | 7 | 10 | 14 | 13 | 17 | 3 | 9 | 9 | 3 | 17 | 13 | 14 | 10 | 7 | 1 |
| GROUP 8 | 1 | 8 | 17 | 6 | 17 | 8 | 1 | 15 | 12 | 5 | 13 | 7 | 13 | 5 | 12 | 15 |
| GROUP 9 | 1 | 9 | 7 | 15 | 4 | 16 | 16 | 4 | 15 | 7 | 9 | 1 | 12 | 17 | 17 | 12 |
| GROUP 10 | 1 | 10 | 14 | 7 | 8 | 7 | 14 | 10 | 1 | 9 | 5 | 12 | 11 | 12 | 5 | 9 |
| GROUP 11 | 1 | 11 | 4 | 16 | 12 | 15 | 12 | 16 | 4 | 11 | 1 | 6 | 10 | 7 | 10 | 6 |
| GROUP 12 | 1 | 12 | 11 | 8 | 16 | 6 | 10 | 5 | 7 | 13 | 14 | 17 | 9 | 2 | 15 | 3 |
| GROUP 13 | 1 | 13 | 1 | 17 | 3 | 14 | 8 | 11 | 10 | 15 | 10 | 11 | 8 | 14 | 3 | 17 |
| GROUP 14 | 1 | 14 | 8 | 9 | 7 | 5 | 6 | 17 | 13 | 17 | 6 | 5 | 7 | 9 | 8 | 14 |
| GROUP 15 | 1 | 15 | 15 | 1 | 11 | 13 | 4 | 6 | 16 | 2 | 2 | 16 | 6 | 4 | 13 | 11 |
| GROUP 16 | 1 | 16 | 5 | 10 | 15 | 4 | 2 | 12 | 2 | 4 | 15 | 10 | 5 | 16 | 1 | 8 |
| GROUP 17 | 1 | 17 | 12 | 2 | 2 | 12 | 17 | 1 | 5 | 6 | 11 | 4 | 4 | 11 | 6 | 5 |
| GROUP 18 | 2 | 8 | 11 | 15 | 14 | 1 | 4 | 10 | 10 | 4 | 1 | 14 | 15 | 11 | 8 | 2 |
| GROUP 19 | 2 | 9 | 1 | 7 | 1 | 9 | 2 | 16 | 13 | 6 | 14 | 8 | 14 | 6 | 13 | 16 |
| GROUP 20 | 2 | 10 | 8 | 16 | 5 | 17 | 17 | 5 | 16 | 8 | 10 | 2 | 13 | 1 | 1 | 13 |
| GROUP 21 | 2 | 11 | 15 | 8 | 9 | 8 | 15 | 11 | 2 | 10 | 6 | 13 | 12 | 13 | 6 | 10 |
| GROUP 22 | 2 | 12 | 5 | 17 | 13 | 16 | 13 | 17 | 5 | 12 | 2 | 7 | 11 | 8 | 11 | 7 |
| GROUP 23 | 2 | 13 | 12 | 9 | 17 | 7 | 11 | 6 | 8 | 14 | 15 | 1 | 10 | 3 | 16 | 4 |
| GROUP 24 | 2 | 14 | 2 | 1 | 4 | 15 | 9 | 12 | 11 | 16 | 11 | 12 | 9 | 15 | 4 | 1 |
| GROUP 25 | 2 | 15 | 9 | 10 | 8 | 6 | 7 | 1 | 14 | 1 | 7 | 6 | 8 | 10 | 9 | 15 |
| GROUP 26 | 2 | 16 | 16 | 2 | 12 | 14 | 5 | 7 | 17 | 3 | 3 | 17 | 7 | 5 | 14 | 12 |
| GROUP 27 | 2 | 17 | 6 | 11 | 16 | 5 | 3 | 13 | 3 | 5 | 16 | 11 | 6 | 17 | 2 | 9 |
| GROUP 28 | 2 | 1 | 13 | 3 | 3 | 13 | 1 | 2 | 6 | 7 | 12 | 5 | 5 | 12 | 7 | 6 |
| GROUP 29 | 2 | 2 | 3 | 12 | 7 | 4 | 16 | 8 | 9 | 9 | 8 | 16 | 4 | 7 | 12 | 3 |
| GROUP 30 | 2 | 3 | 10 | 4 | 11 | 12 | 14 | 14 | 12 | 11 | 4 | 10 | 3 | 2 | 17 | 17 |
| GROUP 31 | 2 | 4 | 17 | 13 | 15 | 3 | 12 | 3 | 15 | 13 | 17 | 4 | 2 | 14 | 5 | 14 |
| GROUP 32 | 2 | 5 | 7 | 5 | 2 | 11 | 10 | 9 | 1 | 15 | 13 | 15 | 1 | 9 | 10 | 11 |
| SYNC BTS | 2 | 6 | 14 | 14 | 6 | 2 | 8 | 15 | 4 | 17 | 9 | 9 | 17 | 4 | 15 | 8 |
| (SYNC BTS) | 1 | 1 | 1 | 1 | 1 | 1 | 1 | 1 | 1 | 1 | 1 | 1 | 1 | 1 | 1 | 1 |

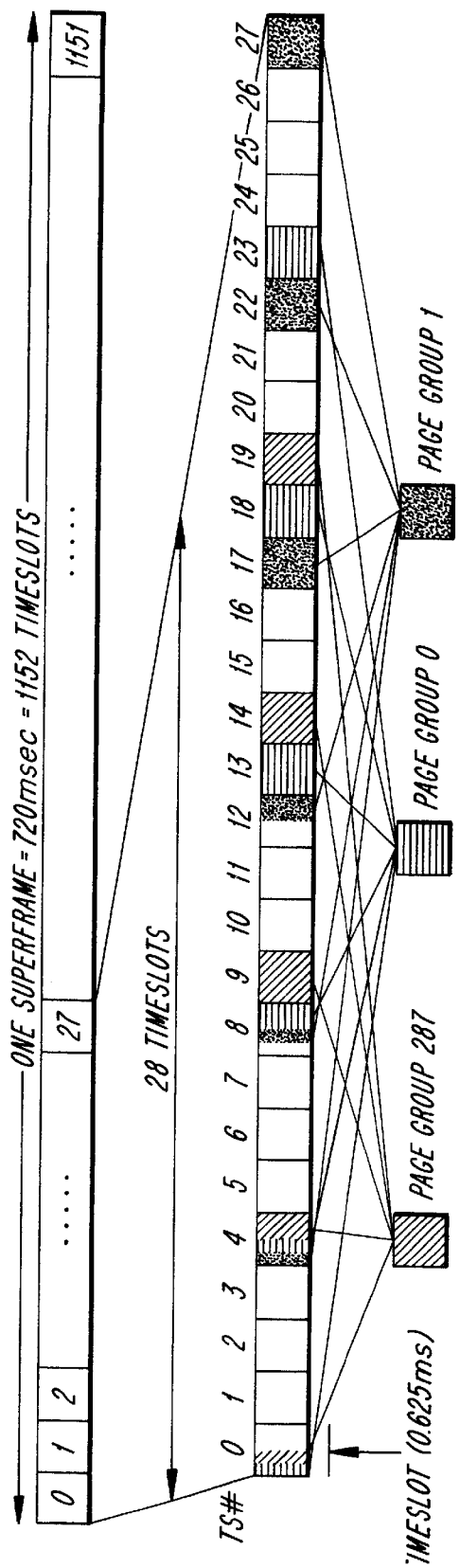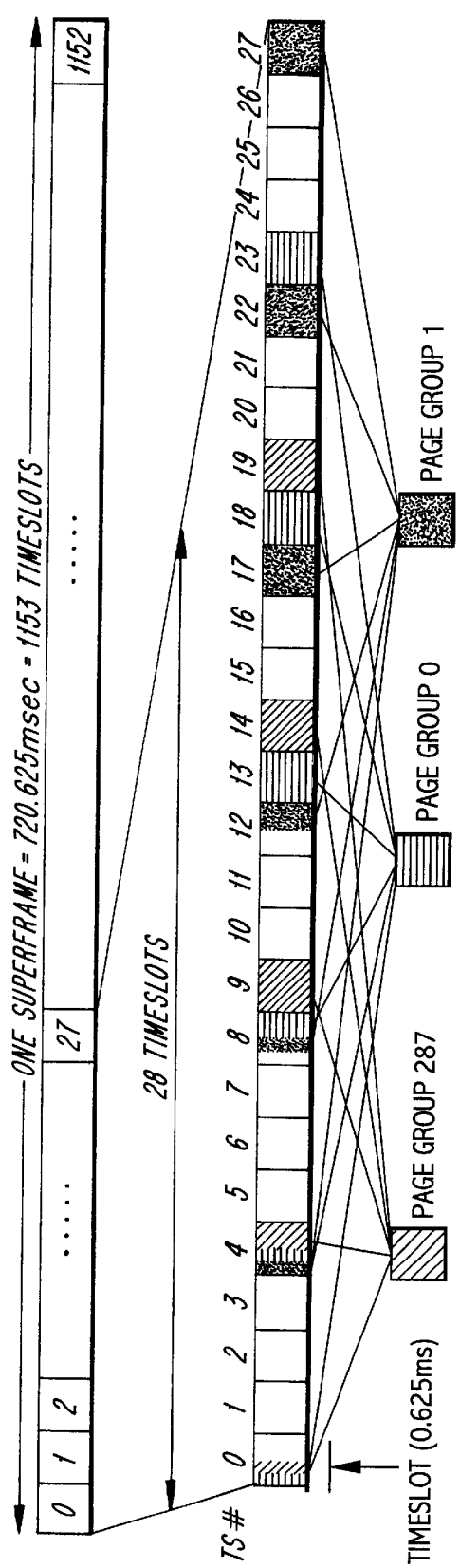

PAGING CHANNEL CONFIGURATION FOR EFFICIENT WAKE-UP PERIOD UTILIZATION

BACKGROUND

The present invention is directed to a method and an apparatus for reducing the standby power consumption of battery operated cordless or radio telephones.

Conventionally, it has been demonstrated that the power consumption of battery operated portable telephones can be reduced by operating these devices in a standby mode (also sometimes referred to as "idle mode") during the time between conversations when waiting for the subscriber to initiate a new call or to receive a new call from the network. The principal mechanism employed to reduce standby power consumption is to turn off the transmitter so that only the receiver is operating, i.e., listening to a designated network calling channel. However, modern hand-held telephones are so small that the available capacity of the small internal batteries is only sufficient to operate the receiver continuously for a few hours.

Accordingly, another method has been described and employed in various radiocommunication systems, e.g., systems designed in accordance with the European Global System for Mobile Communications (GSM) digital cellular system standard, to further reduce a receiver's standby mode power consumption. This method involves pulsing the receiver on and off with a low duty factor. More specifically, the network is aware of the periods during which the receiver in any given portable station will be powered on so that the transmission of paging messages to a particular remote device can be timed to arrive at the remote device at those times. This technique is sometimes referred to as placing the remote device in a "sleep mode" whereupon it periodically "wakes up" to read the paging channel and to determine if a call is to be setup.

Portable telephones are, according to the GSM system specification, divided into sleep-mode groups either according to some of the digits of their telephone numbers or as designated by the network operator. As a simple example, those telephones having a number ending in 0 could belong to sleep-mode group 0; those ending in 1 to sleep-mode group 1 and so on. The network calling channel capacity is divided in time into a number of cyclically repeating periods (timeslots) corresponding to the sleep-mode groups. A call to a telephone is then transmitted only in a period corresponding to its sleep-mode group, when it is known to be awake. Upon waking, receiving such a message from the network and detecting that its own telephone number or identification number (ID) is being called, the portable receiver may stop pulsing and remain on continuously to receive further information and the portable transmitter may be activated to reply to the call when the subscriber accepts the call by, for example, pressing an appropriate button. In addition to waking up during its pre-assigned paging period to determine if it is being called by the network, a remote device may also need to periodically monitor the transmissions of neighboring base stations in order to ensure that it is listening to a preferred base station that provides a high quality connection.

As will further be apparent to those skilled in the art, it is desirable to maximize the amount of time that a remote device is sleeping to increase standby time associated with a given battery source. To accomplish this objective, it would further be desirable for a remote device to perform both of the aforedescribed tasks, i.e., listening for paging messages having its identification number and any further auxiliary functions, at the same time, e.g., when the remote device wakes up to read the paging channel.

However, as the complexity of radiocommunication systems generally increases to support increases in performance and capacity, the complexity and number of tasks performed by the remote devices to be able to properly detect and decode information transmitted by the system increase as well. Certain proposed wideband code division multiple access (W-CDMA) schemes require that remote devices perform, in addition to various types of time synchronization, certain other functions in order, for example, to identify the despreading codes associated with various base stations' transmissions. These additional functions may require that the remote device read, in addition to its assigned paging timeslot(s) in each superframe, a plurality of different timeslots within the frame structure of a broadcast control channel, i.e., differently numbered timeslots. If, however, the remote devices are designed to "wake up" in the same numbered timeslot or timeslots in every superframe for paging purposes, it is then impossible for both the paging functions and the other, auxiliary functions to be performed at the same time, since the remote device would only be reading the same numbered timeslot in each superframe for both the control channel and the paging channel. Thus, the remote device will have to "wake up" for at least one other timeslot in each superframe in order to read the different numbered timeslot information needed for auxiliary processing. As mentioned above, this is undesirable since it increases the power consumption during standby mode.

Accordingly, it would be desirable to provide systems, remote devices and techniques which are designed to reduce standby power consumption by permitting the remote device to perform both its paging functions and other auxiliary functions (e.g., base station code identification functions) during its assigned paging timeslot(s).

SUMMARY

These and other limitations and drawbacks of conventional sleep mode and paging techniques are overcome according to exemplary embodiments of the present invention which make it possible for the remote device to acquire information from differently numbered timeslots on a control channel, while only awakening for the minimum amount of time needed to read its assigned paging timeslot(s). According to one exemplary embodiment, this can be accomplished by providing a different number of timeslots per superframe in the paging channel than in the control channel. In this way, an incremental timeslot offset between control channel superframes and paging channel superframes is created. Thus, when a remote device awakens to read its assigned paging timeslot(s) it can, at the same time, read a concurrently received control channel timeslot. Due to the created offset, the concurrently received control channel timeslot will change from superframe to superframe, even when the remote station is reading the same paging timeslot relative to the paging channel superframe structure.

According to another exemplary embodiment of the present invention, reading information on differently numbered timeslots of a control channel while minimizing powered on time in standby mode can be accomplished by remapping the remote device to different paging groups and taking advantage of any additional awake time. By remapping the remote device to different paging groups, the remote device will be able to read differently numbered timeslots on the control channel. Moreover, if a remote device needs to be awake for more time than just its assigned paging timeslot (e.g., to perform channel estimation), then this additional time can also be employed for reading differently numbered timeslots on the control channel.

According to yet another exemplary embodiment, the assigned initial timeslot associated with any given remote device can be varied from superframe to superframe to provide the remote device with an opportunity to read the information in different control channel timeslots when it awakens to listen for paging messages.

BRIEF DESCRIPTION OF THE DRAWINGS

The invention of the present application will now be described in more detail with reference to the preferred embodiments of the method and apparatus, given only by way of example, and with reference to the accompanying drawings, in which:

FIG. 2(a) is a block diagram of an exemplary transmitter and receiver structure which can be used in conjunction with the present invention;

FIG. 2(b) is a chart illustrating an exemplary mapping between spreading code/timeslot sequences and long code groups;

FIG. 3 illustrates a paging channel timeslot structure and paging group mapping for a conventional paging scheme;

FIG. 4 depicts a modified paging channel timeslot structure and paging group mapping in accordance with an exemplary embodiment of the present invention;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using a hybrid TDMA/CDMA methodology, in which communication between the base station and the mobile terminals is performed using spreading codes, but wherein information is also conveyed in discrete time slots. However, those skilled in the art will appreciate that the concepts disclosed herein find use in other methodologies, including, but not limited to, frequency division multiple access (FDMA), TDMA, CDMA or any other access methodology. Likewise, some of the exemplary embodiments provide illustrative examples relating to an exemplary frame and logical channel structure which is under consideration for certain third generation radiocommunication systems, however, the techniques described herein are equally applicable to equipment used in any system.

Figure 1:
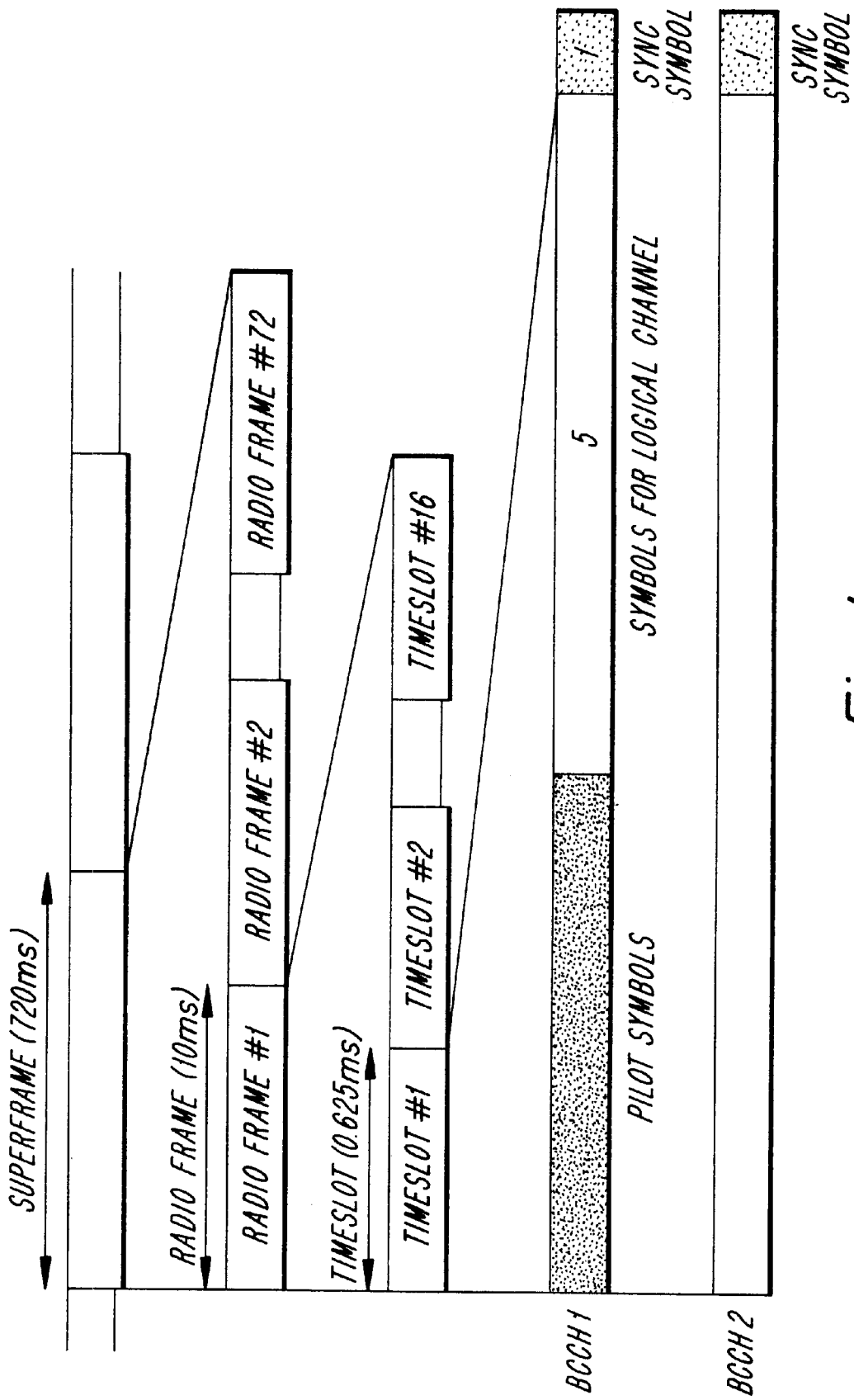
FIG. 1 illustrates frame structures associated with an air interface which can be used to implement the present invention.

When the first frame of a desired information signal is received by a receiver, in most communication systems, the clock at the transmitter and the clock at the receiver are not "locked", i.e. they are not synchronized in time. One part of this locking procedure is commonly referred to as frame synchronization. For the purposes of illustration, and not limitation, consider the exemplary frame and timeslot structures associated with the air interface for this system as depicted in FIG. 1. Therein seventy-two radio frames of 10 ms each make up a superframe. Within each radio frame there are sixteen timeslots. Each time slot includes various types and fields of information, depending upon the channel to which it corresponds. In FIG. 1, two such channels, BCCH1 and BCCH2, are depicted. In certain proposed technologies, these two control channels have been referred to as Perch1 and Perch2, respectively.

These two channels are broadcast control channels transmitted by the base station to all of the mobile stations in the area serviced by that base station, e.g., using different short codes known a priori by the mobiles. As can be seen in the figure, each control channel includes one synchronization symbol (or bit) per timeslot. These synchronization symbols have also been referred to as long code masked symbols (LCMS). The synchronization symbol (or bit) in BCCH2 can be used for frame synchronization as described below, as well as for use in identifying the long code group associated with the base station that is transmitting this channel. BCCH1 also carries pilot symbols which can be used by a receiver, for example, to perform channel estimation, and a logical information channel which can carry varying types of overhead information, e.g., identifying a network operator, sector, etc.

FIG. 2(a) is a block diagram which depicts some of the transmission and reception components which can be used to communicate information over the air interface using the frame and timeslot channel structures illustrated in FIG. 1. Therein, two sources 40 and 50, e.g., supported by different transmitters in a single base station, transmit different signals over the same frequency spectrum using spread spectrum techniques. The input data associated with each source are multiplied by an orthogonal short code and scrambled by an additional long code. The sum of the coded and spread user data is then transmitted using a radio frequency carrier and a transmitting antenna. For example, in FIG. 2(a), user input data 41 is multiplied by an orthogonal short code 43 and scrambled using a long code 45. The sum of the coded and spread user data 47 is used to modulate a radio frequency carrier 49 which is transmitted by transmitting antenna 42. Similarly, user input data 51 is multiplied by an orthogonal short code 53 and scrambled using a long code 55. The sum of the coded and spread user data 57 is used to modulate a radio frequency carrier 59 which is transmitted by transmitting antenna 52. Transmitting antenna 42 transmits signal 44 and transmitting antenna 52 transmits signal 54.

Receiver 60 has a receiving antenna 62. Signals 44 and 54 experience channel effects by virtue of having been transmitted over an air interface, e.g., reflections of signals 44 and 54 that travel along different paths of varying lengths. The interactions between these reflections cause multipath fading whose effects will vary depending upon the specific location of the mobile station at any given time, and the strengths of these signals decrease as the distance between the source and the receiver increases. Receiver 60 can use a RAKE receiver (which is well known to those skilled in the art) to collect the signal energy from different signal paths. When receiver 60 receives signal 98, receiver 60 demodulates the signal using carrier signal 64 to provide composite signal 67. Composite signal 67 is despread using synchronized long code 65 and decoded using synchronized orthogonal code 63. Receiver 60 can use an integrator 68 and a sampler 69 to recreate the transmitted user data.

In addition to processing signals received on its assigned traffic channel, i.e, using a unique short code, a mobile station also has other signal processing tasks. For example, when powered on and idle, the mobile station will listen to a broadcast control channel for various information, e.g., paging messages. Periodically, the mobile station is informed of the neighboring base stations for which it should measure the quality, e.g., signal strength, of the broadcast control channel to which it is listening as well as the quality of control channels broadcast by other neighboring cells, so that the system can ensure that the idle mobile station is listening to an appropriate control channel. In the process of monitoring the quality of broadcast control channels transmitted by neighboring base stations, the mobile station must also synchronize thereto and identify the long codes used by the various base stations to scramble their respective transmissions.

In order to accomplish the signal processing tasks associated with start-up, moving between cells and cell reselection, the receiver 60 must be able to time synchronize to the frame structure of transmissions from various, unsynchronized base stations. According to one technique, the mobile station first acquires timeslot (or primary) synchronization, followed by frame synchronization, long code group identification, and then long code identification. Timeslot synchronization can be performed using the synchronization information found in the first broadcast control channel BCCH1.

The long code group identification process can be performed, for example, by varying (at the base station) the spreading (i.e., short) code used to spread information in timeslots on the BCCH2 in accordance with a predefined sequence associated with a particular long code group, within which group is the long code used by that particular base station for scrambling. Then, the mobile station reads a plurality of timeslots and identifies the spreading code used for each timeslot, i.e., by correlating one symbol in each timeslot to each of a set of possible short codes. The mobile station can then determine a sequence of short codes used by the base station and compare that sequence with a stored table, e.g,. that shown in FIG. 2(*b*). This permits the mobile station to determine the long code group associated with the base station transmitting any given BCCH2, from which the mobile station can then determine the specific long code by performing another set of correlations.

Since the predefined long code group identification sequences in FIG. 2(*b*) have unique cyclical shifts, by identifying the shifts, the mobile station can also determine frame synchronization. Alternatively, if long code group identification is performed in some other manner than described above, other techniques may be needed to perform frame synchronization.

For example, frame synchronization can be performed using the synchronization symbol or bit found in differently numbered timeslots broadcast on BCCH2. More precisely, the synchronization symbol or bit (e.g., LCMS) is transmitted by the base station in each timeslot of this control channel according to a predetermined, cyclical pattern which can be used by the mobile station to determine the location of the frame boundary for the base station to which it is currently listening. The synchronization sequence is typically one which is selected to have good auto-correlation properties, e.g., maximal length sequences. One exemplary sequence which has been previously proposed for use as the synchronization sequence and will be used here to better explain the present invention is:

1, 1, 1, −1, −1, −1, −1, 1, −1, 1, −1, −1, 1, 1, −1, 1, although those skilled in the art will appreciate that the present invention can be implemented using any sequence of bits, or for that matter any sequence of symbols regardless of whether the symbols are represented using a binary alphabet (including any shift of this sequence) or an M-ary alphabet. For this sequence, however, the base station would thus transmit a '1' as the synchronization bit in timeslot #1 of BCCH2, a '1' as the synchronization bit in timeslot #2, . . . and a '1' as the synchronization bit in timeslot #16.

Since the pattern is predetermined and cyclical, the mobile station needs to identify the time shift between the order in which timeslots have been received and the beginning of a frame in order to achieve frame synchronization. This can be achieved in a straightforward manner by determining how many shifts are required to match the sequence of sixteen symbols received by a mobile station with the predetermined, cyclical sequence that is being repeated by the base station. For example, suppose that a mobile station received and decoded sixteen consecutive timeslots of BCCH2 transmitted by a particular mobile station and identified a pattern of:

1, −1, 1, −1, −1, −1, 1, 1, −1, 1, 1, 1, 1, −1, −1, −1, −1 as received synchronization bits. By shifting this pattern 7 places to the right (or 9 places to the left), the received pattern will match the predetermined pattern, thus providing the mobile station with the location of the frame boundary.

In order to perform this frame synchronization function, however, it may be necessary for an idle mobile station to read the synchronization symbol (e.g., LCMS) in each of a plurality of differently numbered timeslots. This task can be accomplished over a number of different superframes, since the synchronization symbol is transmitted repetitively by the base station. However, conventional paging schemes are designed such that the mobile station awakens for the same numbered timeslot or timeslots in a superframe. Consider the following example of a recently proposed paging scheme illustrated in FIG. 3.

Therein, it can be seen that each superframe (for channels including the paging channel and. broadcast control channel) consists of 1152 timeslots. These 1152timeslots are grouped into 288 paging groups, wherein each active (i.e., powered-on) mobile station is assigned to one of the 288 paging groups. In this particular proposal, paging information is transmitted in six segments, spanning a total of four timeslot periods per superframe. In the FIG. 3, it can, for example, be seen that paging group one uses one-quarter of timeslots #4 and #8, one-half of timeslot number #12 and all of timeslots #17, #22 and #27. Although not particularly relevant for this discussion, this paging scheme proposal provides for two indicator segments, e.g., in timeslots #4 and #8 for paging group one, which are repetitive indicators informing those mobile stations assigned to paging group one of whether there are any paging messages addressed thereto. If a mobile unit correctly decodes the information in timeslot #4 and this information indicates that there are no pages for it in this superframe, then it can return to sleep mode operation and need not read the remaining timeslots, e.g., timeslots #8, #12, #17, #22 and #27, associated with its paging group. In this proposed paging scheme, it. can therefore be seen that each mobile station will only necessarily wake-up for the same numbered timeslot in each superframe, until it receives a paging message or initiates an access request to the system.

Since the mobile station may only awaken for the same numbered timeslot in each superframe for the purpose of listening for paging messages, it does not have the opportunity to read the synchronization symbol from differently numbered timeslots for the purpose of frame synchronization and long code group identification described above. Accordingly, under this recently proposed paging scheme, it will be necessary to awaken the mobile station for other timeslots to read such timeslots, which reduces the effectiveness of sleep mode operation.

Thus, Applicants have developed alternative techniques described below which enable remote devices to awaken only for their assigned paging timeslot or timeslots, and yet still read the synchronization symbol from differently numbered timeslots over a series of superframes. According to a first exemplary embodiment, illustrated in FIG. 4, this can be accomplished by introducing an offset between the frame structure of the paging channel and the frame structure of the broadcast control channel, e.g., BCCH2 in FIG. 1.

In FIG. 4, Applicants propose to add a timeslot to the paging channel superframe structure, e.g., to provide 1153 timeslots per superframe instead of 1152 as in FIG. 3. This additional timeslot introduces an offset between the superframe structure of the paging channel and the superframe structure of the broadcast control channel, which offset can be used to permit remote devices to read different numbered timeslots in sequential superframes of broadcast control channel information when waking up to read the same numbered timeslot on sequential superframes of the paging channel. More specifically, a remote device of paging group K still wakes up during slot 4K of superframe $N_{SF}$, for $N_{SF}$=0, 1,2 . . . , just as in the prior proposed paging scheme of FIG. 3. However, due to the additional timeslot in the paging channel superframe structure relative to the structure of the broadcast control channel, the remote unit is able to also receive the synchronization slot from the Nth timeslot of the broadcast control channel frame, wherein N=(4K+$N_{SF}$ mod 16), wherein the operator "mod" refers to dividing the first operand (e.g., 4K+$N_{SF}$) by the second operand (e.g., 16) and outputting the remainder. Thus as $N_{SF}$ increases, a remote device has an opportunity to receive the synchronization symbol, e.g., LCMS, from a number of different timeslots, e.g., all sixteen differently numbered timeslots, in a broadcast control channel frame. In this way the remote device can perform, for example, frame synchronization or other functions which require reading of different timeslots on the broadcast control channel, without having to wake-up for more than one timeslot per superframe.

Figure 5:
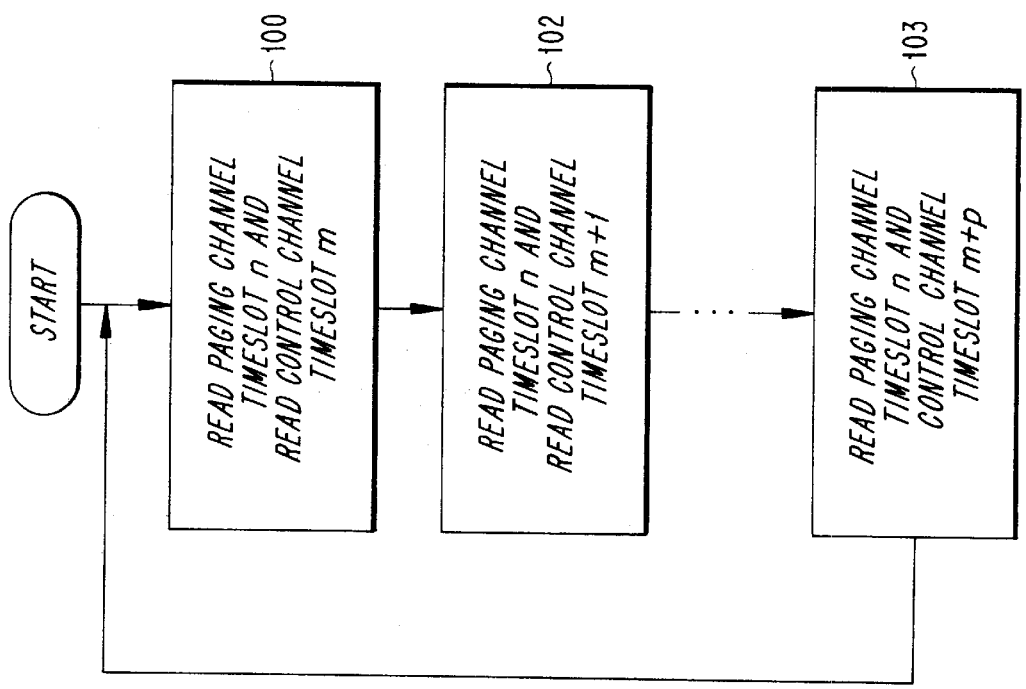
FIG. 5 is a flowchart illustrating an exemplary method according to an exemplary embodiment of the present invention.

This technique can be summarized by way of the flowchart of FIG. 5. Therein, at step 100, the remote device reads its assigned timeslot n on the paging channel during a first superframe and, at the same time, reads a concurrently transmitted timeslot m on the broadcast control channel to, for example, read the synchronization symbol transmitted in timeslot m. During the next superframe, at step 102, the remote device again reads its assigned timeslot, n on the paging channel, but this time reads timeslot m+1 on the broadcast control channel since the system broadcasts an extra timeslot on each the paging channel, thereby introducing a superframe by superframe offset between the paging channel and the broadcast control channel. Thus, the remote device acquires, for example, the next synchronization symbol and can, through repeated iterations, determine, e.g., the LCMS pattern which enables the remote device to acquire frame synchronization. As indicated by step 103, depending upon the number of timeslots per frame, the cycle will, after some number of iterations p, return to reading timeslot m of the control channel once again.

Note that the mapping between paging groups and timeslots in FIG. 4 is the same as that in FIG. 3, although those skilled in the art will understand that this need not necessarily be the case. Thus, in this example, the additional timeslot #1024 added to the paging channel may be an idle slot. Alternatively, other information could be transmitted by the system during this timeslot. Moreover, although this exemplary embodiment illustrates an exemplary offset of one timeslot between the paging channel and the broadcast control channel which permits different ones of the consecutively numbered timeslots of the broadcast control channel to be read during each of a remote device's assigned paging timeslots, those skilled in the art will appreciated that more than one timeslot could be added to the paging channel structure to create a different offset.

It may, however, be necessary for the remote device to wake-up for more than just its assigned paging timeslot(s) in order to properly receive and decode the paging information. For example, a mobile station in paging group one may need to wake-up one or more timeslots in advance of timeslot #4 in the paging channel superframe structure in order to perform channel estimation of pilot symbols so that it can properly decode the information in timeslot #4 when that information is received. Under these circumstances, it is possible to re-map the paging groups according to another exemplary embodiment of the present invention such that the system transmits information using the same superframe timeslot structure for both the paging channel and the broadcast control channel, and yet the remote device can still read a plurality of differently numbered timeslots on the broadcast control channel. More specifically, according to this second exemplary embodiment of the present invention, the remote device changes paging groups from superframe to superframe so that it can receive differently numbered timeslots on the broadcast control channel.

Consider the following example, wherein a remote device has to wake-up for four timeslots in order to be able to properly read the information in its assigned paging timeslot. Then, one can create a remapping function such that a remote device changes between paging groups in a manner that allows it to read, for example, all sixteen differently numbered timeslots of a broadcast control channel over the course of four superframes. For example, let f(i) designate some original function used to determine the paging group number $N_{PG}$ for a remote device having an identification number i, where $0 \leq f(i) \leq N_{PG}-1$, then the paging group assignment can be changed as a function of the superframe according to $g(i)=(f(i)+N_{SF})$ mod $N_{PG}$. In this way, the paging group to which a particular remote device will belong will be: f(i), f(i)+1, f(i)+2, . . . , during superframe 0, 1, 2, . . . , respectively. Using the exemplary paging slot assignment illustrated in FIG. 3 above (i.e., initial paging slot=g(i) mod 16), and assuming as an example that f(i)=0, then the paging timeslot number which the remote device will read for each consecutive superframe will cycle through between timeslots #0, #4, #8, #12, #0, #4, . . . etc. Since, in this exemplary embodiment, the paging timeslot number corresponds to the control channel timeslot number, the remote device will be able to read all of the differently numbered control channel timeslots if the remote device is awake for a total of four timeslots to read its assigned paging channel timeslot.

Figure 6:
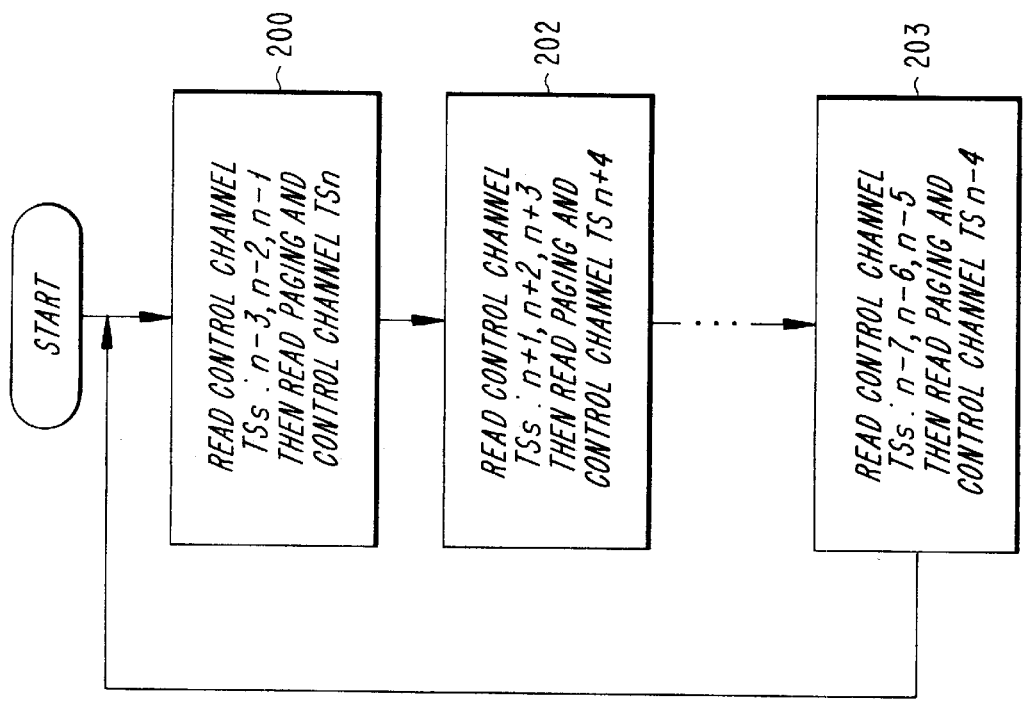
FIG. 6 is a flowchart illustrating a method according to another exemplary embodiment of the present invention.

Thus, this second exemplary embodiment can be summarized as illustrated by the flowchart of FIG. 6. Therein, at step 200, the remote device is assigned to a first paging group whereby it reads paging timeslot #n to see if it is being paged. However, the remote device wakes up three timeslots earlier to acquire channel estimation information and uses that time to read control channel timeslots #n−3, #n−2, #n−1 as well as #n, to acquire, for example, each of the synchronization (LCMS) symbols transmitted thereon. It will be appreciated by those skilled in the art that although the remote device wakes up "early" to acquire additional channel estimation information to be able to better decode its assigned paging timeslot n, it can still read the first few slots of LCMS information (albeit with less information about the radio channel). Since the LCMS information is repeated in each frame, the remote device will have other opportunities to re-read this information if the lack of initial channel information results in an inaccurate first reading.

The remote device is then reassigned (or remapped) to a different paging group for the next superframe such that it reads paging timeslot #n+4 in the next superframe at step 202. Again, since (for this exemplary embodiment) the remote device awakens early to perform channel estimation it can also read timeslot #n+1, n+2 and n+3 on the control channel to acquire the synchronization symbol and/or any other information available during this time. This process continues cyclically until, as indicated by step 203, the cycle returns to the point where the remote device is again assigned to its original paging group and the flow returns to the beginning. In this way, the remote device can acquire, for example, all sixteen synchronization symbols to determine the frame pattern and, as described above, use this information to synchronize to the frame.

The exemplary embodiment of FIG. 6 illustrates that by remapping the remote device to different paging groups, and taking advantage of any additional time that the remote device might also need to be awake to acquire any paging messages that are directed to it, auxiliary functions associated with reading different timeslots on the control channel can also be accommodated. More generally, the technique described in this latter embodiment can also be applied in situations where the remote device does not need to be awake for additional timeslots and/or cannot read additional timeslots other than its assigned paging timeslot, yet in a manner which will enable the remote device to still acquire the synchronization symbol from differently numbered timeslots on the control channel.

For example, instead of remapping the remote device to different paging groups, the system can reconfigure the superframe structure such that the assigned initial paging timeslot for each group is changed from superframe to superframe. Thus the timeslot number in which the initial paging information is transmitted for a paging group K can vary as:

$$N=4K+(N_{SF} \bmod 16)$$

If the paging information is transmitted in different portions, e.g., six portions in the examples provided with respect to FIGS. 3 and 4, then the timeslots for transmitting these additional portions will each shift along with the initial paging timeslot, e.g., using timeslots #N+4, N+8, N+13, N+18 and N+23 in any given superframe. By changing the initial paging timeslot in this way, the remote device will also have the opportunity to read differently numbered timeslots on the control channel and, thereby, reading the different information associated therewith.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method for transmitting information to a remote device in a radiocommunication system comprising the steps of:

transmitting information on a control channel in control channel timeslots, each of said control channel timeslots being repeatedly transmitted in consecutive superframes, each superframe including a first number of control channel timeslots; and transmitting paging information on a paging channel in paging timeslots, each of said paging timeslots being repeatedly transmitted in consecutive superframes, each superframe having a second number of paging timeslots, wherein said first number of control channel timeslots is different than said second number of paging timeslots.

2. The method of claim 1, wherein said first number of control channel timeslots is n and said second number of paging timeslots is n+1.

3. The method of claim 1, wherein said step of transmitting information on said control channel in control channel timeslots comprises the further step of spreading said information to be transmitted using at least one spreading code; and wherein said step of transmitting paging information on said paging channel in paging timeslots comprises the further step of spreading said paging information to be transmitted using at least one spreading code.

4. The method of claim 2, wherein said second step of transmitting further comprises the step of:

transmitting one of said paging timeslots without paging information.

5. The method of claim 1, wherein said first step of transmitting further comprises the step of:

transmitting, in each control channel timeslot, a synchronization symbol, wherein a number of synchronization symbols in consecutive control channel timeslots create a frame boundary pattern.

6. A radiocommunication system comprising:

means for transmitting information on a control channel in control channel timeslots, each of said control channel timeslots being repeatedly transmitted in consecutive superframes, each superframe including a first number of control channel timeslots; and means for transmitting paging information on a paging channel in paging timeslots, each of said paging timeslots being repeatedly transmitted in consecutive superframes, each superframe having a second number of paging timeslots, wherein said first number of control channel timeslots is different than said second number of paging timeslots.

7. The system of claim 6, wherein said first number of control channel timeslots is n and said second number of paging timeslots is n+1.

8. The system of claim 6, wherein said means for transmitting information on said control channel in control channel timeslots further comprises means for spreading said information to be transmitted using at least one spreading code; and wherein said means for transmitting paging information on said paging channel in paging timeslots further comprises means for spreading said paging information to be transmitted using at least one spreading code.

9. The system of claim 7, wherein said means for transmitting said paging information further comprises:

means for transmitting one of said paging timeslots without paging information.

10. The system of claim 6, wherein said means for transmitting said control channel information further comprises:

means for transmitting, in each control channel timeslot, a synchronization symbol, wherein a number of synchronization symbols in consecutive control channel timeslots create a frame boundary pattern.

11. A method for receiving information in a spread spectrum radiocommunication system while in standby mode comprising the steps of:

receiving information on both a control channel and a paging channel during an assigned paging timeslot in a first superframe;

changing said assigned paging timeslot after said first superframe; and receiving information on both said control channel and said paging channel during said changed assigned paging timeslot in a second superframe.

12. The method of claim 11, further comprising the step of:

receiving, in a control channel timeslot during said first superframe and a different control channel timeslot during said second superframe, a synchronization symbol, wherein a number of synchronization symbols in consecutive control channel timeslots create a frame boundary pattern.

13. A mobile station comprising:

means for receiving information on both a control channel and a paging channel during an assigned paging timeslot in a first superframe;

means for changing said assigned paging timeslot after said first superframe; and means for receiving information on both said control channel and said paging channel during said changed assigned paging timeslot in a second superframe.

14. The mobile station of claim 13, further comprising:

means for acquiring frame synchronization by decoding long code masked symbols on a plurality of differently numbered timeslots received on said control channel.

15. A method for transmitting information to a remote device in a radiocommunication system comprising the steps of:

transmitting overhead information on a broadcast control channel in consecutively numbered timeslots, said consecutively numbered timeslots being repeatedly transmitted in consecutive frames;

transmitting paging information on a paging channel in consecutively numbered timeslots, said consecutively numbered timeslots being repeatedly transmitted in consecutive superframes;

assigning said remote device to at least one of said consecutively numbered timeslots associated with said paging channel; and reading, by said remote device in each of a plurality of superframes, information transmitted by said system in said assigned timeslot of said paging channel and information transmitted by said system in a concurrently transmitted one of said consecutively numbered timeslots of said broadcast control channel, wherein said concurrently transmitted one of said consecutively numbered timeslots of said broadcast control channel is different from superframe to superframe.

16. The method of claim 1, wherein said control channel is a synchronization channel and said control channel timeslots include information usable by said remote device to acquire frame synchronization.

17. The method of claim 1, wherein said control channel timeslots include information usable by said remote device to identify a long code group.

18. The system of claim 6, wherein said control channel is a synchronization channel and said control channel timeslots include information usable by a remote device to acquire frame synchronization.

19. The system of claim 6, wherein said control channel timeslots include information usable by a remote device to identify a long code group.

20. The method of claim 1, wherein said first step of transmitting further comprises the step of:

transmitting, in each control channel timeslot, information spread by a spreading code selected from a sequence of spreading codes, wherein a number of spreading codes in consecutive control channel timeslots create a long code group identification pattern.

21. The system of claim 6, wherein said means for transmitting said control channel information further comprises:

means for transmitting, in each control channel timeslot, information spread by a spreading code selected from a sequence of spreading codes, wherein a number of spreading codes in consecutive control channel timeslots create a long code group identification pattern.

22. The method of claim 11, further comprising the step of:

receiving, in a control channel timeslot during said first superframe and a different control channel timeslot during said second superframe, information spread using different spreading codes, wherein a number of spreading codes used in consecutive control channel timeslots create a long code group identification pattern.

23. The mobile station of claim 13, further comprising:

means for identifying a long code group by identifying a sequence of spreading codes used to transmit information on a plurality of differently numbered timeslots received on said control channel.

24. A method for transmitting information in a spread spectrum radiocommunication system comprising the steps of:

transmitting information to a plurality of mobile stations on a control channel and to at least one particular mobile station on a paging channel during an assigned paging timeslot in a first superframe;

changing said assigned paging timeslot after said first superframe; and transmitting information to said at least one particular mobile station on said paging channel during said changed assigned paging timeslot in a second superframe.

25. The method of claim 24, wherein said step of changing said assigned paging timeslot further comprises the step of:

remapping said at least one particular mobile station from a first paging group to a second paging group.

26. The method of claim 24, wherein said step of changing said assigned paging timeslot further comprises the step of:

incrementing said assigned paging timeslot by one.

\* \* \* \* \*